United States Patent
Iossiphidis

(10) Patent No.: US 8,745,594 B1
(45) Date of Patent: Jun. 3, 2014

(54) PROGRAM FLOW SPECIFICATION LANGUAGE AND SYSTEM

(71) Applicant: Technobasics Software Inc., Scarborough (CA)

(72) Inventor: Joseph Iossiphidis, Scarborough (CA)

(73) Assignee: Technobasics Software Inc., Scarborough, Ontario (CA)

(*) Notice: Subject to any disclaimer, the term of this patent is extended or adjusted under 35 U.S.C. 154(b) by 0 days.

(21) Appl. No.: 13/891,532

(22) Filed: May 10, 2013

(51) Int. Cl.
*G06F 9/44* (2006.01)

(52) U.S. Cl.
USPC ............ 717/127; 717/124; 717/126; 717/131

(58) Field of Classification Search
None
See application file for complete search history.

(56) References Cited

U.S. PATENT DOCUMENTS

| | | | |
|---|---|---|---|
| 4,852,047 A | 7/1989 | Lavallee et al. | |
| 5,842,017 A * | 11/1998 | Hookway et al. | 717/158 |
| 5,999,731 A | 12/1999 | Yellin et al. | |
| 6,405,361 B1 * | 6/2002 | Broy et al. | 717/104 |
| 6,988,262 B1 * | 1/2006 | Mallory et al. | 717/127 |
| 7,120,572 B1 | 10/2006 | Liang | |
| 7,140,005 B2 * | 11/2006 | Maliszewski | 717/126 |
| 7,168,065 B1 * | 1/2007 | Naccache et al. | 717/127 |
| 7,299,454 B2 * | 11/2007 | Pugh et al. | 717/125 |
| 7,478,371 B1 * | 1/2009 | Gove | 717/128 |
| 7,584,457 B2 | 9/2009 | Hammerich et al. | |
| 7,761,847 B2 | 7/2010 | Kornerup et al. | |
| 7,827,534 B2 | 11/2010 | Vetillard et al. | |
| 7,895,580 B1 * | 2/2011 | Nikolov | 717/130 |
| 7,921,412 B1 * | 4/2011 | Laura | 717/127 |
| 8,484,613 B2 * | 7/2013 | Somakumar et al. | 717/110 |
| 2005/0034104 A1 * | 2/2005 | Pugh et al. | 717/124 |
| 2006/0020920 A1 * | 1/2006 | Septon | 717/124 |
| 2006/0174226 A1 * | 8/2006 | Fair et al. | 717/127 |

(Continued)

FOREIGN PATENT DOCUMENTS

| | | |
|---|---|---|
| WO | WO0150250 | 7/2001 |
| WO | WO2004036421 | 4/2004 |

OTHER PUBLICATIONS

Bernstein, A., et al., Semantic Conditions for Correctness at Different Isolation Levels, Proceedings of 16th International Conference on Data Engineering, 2000, pp. 57-66, [retrieved on Jan. 17, 2014], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Kagan Binder, PLLC

(57) ABSTRACT

A programming language and computer system adapted to receive and execute f-programs written in a programming language that provides a mechanism to sequence and check the correctness of the execution of a plurality of code segments. The method provides for sequencing the execution of p-segments by a computer processor, where each p-segment is a sequence of one or more executable statements. The p-segments may be part of a manipulation program. An f-program includes a number of f-segments. The manipulation program is configured so that after the completion of execution of each p-segment, control is passed to a specific f-segment associated with the completed p-segment, and at least one variable identifier and value of the variable computed by the completed p-segment is passed to the f-segment so that the f-segment either causes execution to terminate or passes control to one of the p-segments.

23 Claims, 2 Drawing Sheets

(56) References Cited

U.S. PATENT DOCUMENTS

2006/0200807 A1\* 9/2006 Bates et al. .................... 717/129
2009/0150862 A1 6/2009 Hamilton
2011/0167413 A1\* 7/2011 Kim et al. ..................... 717/131
2011/0185341 A1\* 7/2011 Somakumar et al. ......... 717/110
2012/0117537 A1 5/2012 Sierk et al.

OTHER PUBLICATIONS

Back, R-J., et al., Semantics and Proof Rules of Invariant Based Programs, Proceedings of the 2011 ACM Symposium on Applied Computing, 2011, pp. 1658-1665, [retrieved on Jan. 17, 2014], Retrieved from the Internet: <URL:http://dl.acm.org/>.\*

\* cited by examiner

PROGRAM FLOW SPECIFICATION LANGUAGE AND SYSTEM

FIELD OF THE INVENTION

The present invention relates generally to programming languages and computer systems adapted to receive and execute programs written in a particular programming language, and more particularly where the programming language provides a mechanism to sequence and check the correctness of the execution of a plurality of code segments.

BACKGROUND OF THE INVENTION

After its completion, a program typically undergoes beta tests to make sure that it works as specified. The beta test is an expensive and time consuming process requiring special software and knowledge. Even after the beta testing we aren't sure that a program works as specified. Such assurance can be achieved if all the paths of a program are examined and such a test is immense. The problem is bigger and more complex because a software system has hundreds and even thousands of cooperating programs. A program is correct, if it has operational correctness and semantics correctness. Operational correctness determines that a program uses and produces the expected data values. Semantic correctness determines that the rules of processing the order of the statements produce the intent of the program.

The uncertainty of program correctness is derived from the fact that programmers find partial help in developing correct programs and that is the syntax of statements. An error in the syntax of a statement is immediately identified by the host compiler but not its operational correctness; there are no general rules for their identification and thus they have to be developed explicitly by the programmer and as the programmer perceive the correctness. A program isn't just a pile of statements; it is a combination of statements whereas their order of process determines the intent of the program. No programming language can independently declare the operational and the semantic correctness of a program; they don't support such syntax and this inability has many ill consequences.

The operational correctness of a statement is explicitly determined by the programmer including the order of processing the statements of a program. Since they cannot be declared by the current programming languages, we aren't sure that they are used correctly. Moreover, the order of processing the statements is expressed by using operational statements. Hence, it is not clear what the use of a statement is: for manipulation of data or for manipulation of the order of statements. A program becomes complex because it is a mixture of non-homogeneous functional statements hence it is difficult to understand its logic.

The design and development of a system is time consuming and costly because they are better understood with the time. Currently, the logic of a system is rigid because it is described in operational statements and such statements conceal the intent. A change in a system's specifications implies changes in the system's application programs and perhaps in a complex way. Hence, programs may have to be modified, rewritten, or added. It is obvious that it is difficult to estimate the development time and cost of the system under these conditions.

The maintenance of a system is a paramount requirement because a system is written once but it is changed many times in its life time. The maintenance of a system requires the programs to be understood by programmers who perhaps didn't write the original programs. Understanding programs, we are interested in the way a program works or what the statements do and the way they are ordered. Currently, statements used for ordering are alike with the operational statements. Hence, it takes time and activities out of the ordinary to determine how a program works and if a system has hundreds of programs this becomes an immense task. The logic of a program is hidden in operational statements making the system dependent on a few programmers because statements don't reveal their purpose easily without interpretation. Moreover, training new employees is difficult including the education of customers.

Undoubtedly the development of a program takes effort, money, and time. It would be uneconomical to develop a program's structure from scratch every time one is needed. It would clearly be desirable to have a method and system to represent the control follow of a program in a standardized manner so that control code can be generated from such a representation.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a method for sequencing the execution of a number of p-segments by a computer processor, the number being an integer greater than zero and referred to as N, each p-segment being a sequence of one or more statements executable by the processor, each p-segment having a unique identifier, the p-segments being stored in a memory accessible by the computer processor, the p-segments being part of a manipulation program or being called from the manipulation program, the method including the steps of:

(a) providing a flow sequencing program comprising a plurality of f-segments, each f-segment being associated with one or more of the N unique identifiers such that each unique identifier is associated with exactly one f-segment;

(b) configuring the manipulation program to cause control to be first passed to a designated first p-segment upon execution of the manipulation program;

(c) configuring the manipulation program so that after the completion of execution of each p-segment, control is passed to the f-segment associated with the unique identifier associated with the completed p-segment and at least one variable identifier and value of the variable computed by the completed p-segment is passed to the f-segment;

wherein each f-segment is configured either to cause execution of the manipulation program to terminate, or to cause control to be passed to one of the p-segments.

The method may further include the step of executing the manipulation program on the computer processor, where each p-segment may be configured to complete its execution within a finite time, and the flow sequencing program may be configured to cause execution of the manipulation program to terminate within a finite time.

The configuration of the manipulation program to cause control to be passed to the f-segment associated with the unique identifier associated with a completed p-segment after the p-segment has completed may be done by inserting a call in the manipulation program to a pre-defined program, referred to as FlowGenerator, after each p-segment so that the FlowGenerator program causes control to be passed to the f-segment associated with the unique identifier associated with a completed p-segment after the p-segment has completed, and the FlowGenerator program may return the identifier of the next p-segment to be executed to the manipulation program, the manipulation program being configured to pass control to the p-segment identified by the returned identifier.

At least one f-segment may be configured to cause an error to be generated and execution of the manipulation program to be terminated on the occurrence of a pre-determined condition.

At least one of the f-segments may include an acceptance portion and an interaction portion, the acceptance portion being executed before the interaction portion, the acceptance portion comprising at least one statement to verify that the value of the variable corresponding to the at least one variable identifier is within a particular range or is equal to a particular value, and if the value of the variable is not within the particular range or the value of the variable is not equal to the particular value, as the case may be, the f-segment may cause execution of the manipulation program to be terminated.

The interaction portion of at least one f-segment may include at least one f-expression, each f-expression comprising a condition and a specification of the unique identifier of a p-segment that is to be executed next if the condition is evaluated as being true.

Each &segment may have an interaction portion.

A plurality of f-segments may have an acceptance portion.

The flow sequencing program may execute on the same computer processor as the manipulation program and p-segments.

The flow sequencing program and at least one of the p-segments may be written in different programming languages.

The manipulation program may be automatically generated by a program generator based on a specification of N programs representing the p-segments so that the manipulation program, upon execution, first passes control to the designated first p-segment and after the completion of each p-segment, passes control to the f-segment associated with the unique identifier associated with the completed p-segment.

The method may further include an initial step of providing a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the flow sequencing program corresponds to one condition node and one p-segment node with an edge extending from the condition node to the p-segment node.

The flow sequencing program may be generated from the s-diagram.

The step of providing a flow sequencing program may include generating the flow sequencing program from the s-diagram.

The flow sequencing program may be generated from the s-diagram by a computer program running on a computer processor.

The invention further provides a computer system comprising a control computer processor, a computer readable memory accessible by the control computer processor, and a language processor stored in the memory and executable by the control computer processor to receive and execute on the control computer processor an f-program for sequencing the execution of a number of p-segments by a target computer processor, the number being an integer greater than 0 and referred to as N, each p-segment being a sequence of one or more statements executable by the target computer processor, each p-segment having a unique identifier, the p-segments being part of a manipulation program or being called from the manipulation program, wherein the f-program is a flow sequencing program comprising a plurality of f-segments, each f-segment being associated with one or more of the N unique identifiers such that each unique identifier is associated with exactly one f-segment, the manipulation program is configured to cause control to be first passed to a designated first p-segment upon execution of the manipulation program and the manipulation program is configured so that after the completion of execution of each p-segment, control is passed to the f-segment associated with the unique identifier associated with the completed p-segment and at least one variable identifier and value of the variable computed by the completed p-segment is passed to the f-segment, and wherein each f-segment is configured either to cause execution of the manipulation program to terminate, or to pass control to one of the p-segments.

The target computer processor may be the control computer processor and the p-segments may be stored in the computer readable memory.

The target computer processor and control computer processor may be separate processors and control may be passed between the f-program and manipulation program by electronic messages sent via an electronic communications network.

The computer system may further include a FlowGenerator program stored in the memory and executable by the control computer processor, wherein the configuration of the manipulation program to cause control to be passed to the f-segment associated with the unique identifier associated with a completed p-segment after the p-segment has completed may be done by inserting a call to the FlowGenerator program after each p-segment in the manipulation program so that the FlowGenerator program causes control to be passed to the f-segment associated with the unique identifier associated with a completed p-segment after the p-segment has completed, and the FlowGenerator program may return the identifier of the next p-segment to be executed to the manipulation program, the manipulation program being configured to pass control to the p-segment identified by the returned identifier.

At least one of the f-segments may include an acceptance portion and an interaction portion, the acceptance portion being executed before the interaction portion, the acceptance portion comprising at least one statement to verify that the value of the variable corresponding to the at least one variable identifier is within a particular range or is equal to a particular value, and if the value of the variable is not within the particular range or the value of the variable is not equal to the particular value, as the case may be, the f-segment may cause an error to be generated and execution of the manipulation program to be terminated, and wherein the interaction portion of at least one f-segment may comprise at least one f-expression, each f-expression comprising a condition and a specification of the unique identifier of a p-segment that is to be executed next if the condition is evaluated as being true.

The computer system may further include an f-program generator configured to receive a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the f-segment corresponding to the unique identifier of a p-segment node corresponds to one condition node, where an edge connects the p-segment node to the condition node, and another p-segment node with an edge extending from the condition node to the other p-segment node, and wherein the f-program generator generates the f-program from the s-diagram by translating each set of one target condition node and one target p-segment node, where an edge connects the target condition node to the target p-segment node, into an f-expression comprising a condition corresponding to the target condition node and a specification of the unique identifier of a p-segment corresponding to the target p-segment node that is to be executed next if the condition is evaluated as being true.

The invention further provides a computer system including a computer processor, a computer readable memory accessible by the computer processor, an f-program stored in the memory, which f-program is executable by the processor, and a manipulation program comprising a number of p-segments stored in the memory, the manipulation program and p-segments being executable by the processor, the number being an integer greater than 0 and referred to as N, wherein each p-segment is a sequence of one or more executable statements and each p-segment has a unique identifier, wherein the f-program is a flow sequencing program comprising a plurality of f-segments, each f-segment being associated with one or more of the N unique identifiers such that each unique identifier is associated with exactly one f-segment, the manipulation program is configured so that when it is executed on the processor, control is passed to a designated first p-segment and the manipulation program is configured so that after the completion of execution of each p-segment, control is passed to the f-segment associated with the unique identifier associated with the completed p-segment, and at least one variable value computed by the completed p-segment is passed to the f-segment, and wherein each f-segment is configured either to cause execution of the manipulation program to terminate, or to pass control to one of the p-segments.

At least one of the f-segments may include an acceptance portion and an interaction portion, the acceptance portion being executed before the interaction portion, the acceptance portion comprising at least one statement to verify that the value of the variable is within a particular range or is equal to a particular value, and if the value of the variable is not within the particular range or the value of the variable is not equal to the particular value, as the case may be, the f-segment may cause an error to be generated and execution of the manipulation program to be terminated, and wherein the interaction portion of at least one f-segment may comprise at least one f-expression, each f-expression comprising a condition and specifying the unique identifier of a p-segment that is to be executed next if the condition is evaluated as being true.

The computer system may further include an f-program generator configured to receive a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the flow sequencing program may correspond to one condition node and one p-segment node with an edge extending from the condition node to the p-segment node, and wherein the f-program generator may generate the f-program from the s-diagram by translating each set of one target condition node and one target p-segment node, where an edge connects the target condition node to the target p-segment node, into an f-expression comprising a condition corresponding to the target condition node and a specification of the unique identifier of a p-segment corresponding to the target p-segment node that is to be executed next if the condition is evaluated as being true.

BRIEF DESCRIPTION OF THE DRAWINGS

It should be understood that numbers less than 100 appearing in the figures are part of the invention, being labels of elements in s-diagrams. In particular, the label "0" is part of the s-diagram depicted in FIG. 2.

DETAILED DESCRIPTION OF THE INVENTION

Figure 1:
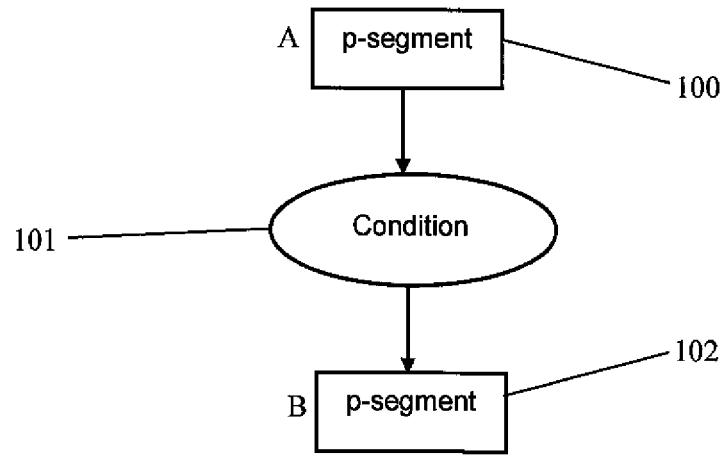
FIG. 1 is an s-diagram containing a single triadic.

The present invention provides a computer program specification language that facilitates sequencing the execution of a number of p-segments by a computer processor. A p-segment is a code segment that is a sequence of one or more executable statements that are capable of being executed by the computer processor. A p-segment may contain statements to read input values, which may be represented as parameters of the p-segment or may be values of variables global to the p-segment, and to calculate and set values of variables, which may be returned from a p-segment through global variable values, return values, parameter values, pointers or other suitable means. The source code for a p-segment, which source code is generally also referred to as a p-segment, may be written in any suitable source language, such as C or assembly language, that can be converted to executable machine code by an automated language translator, such as a compiler or an interpreter, running on a suitable computer processor. Each p-segment is assigned a unique identifier that, without loss of generality, will generally be assumed to be a positive integer.

The p-segments, which may be written in any suitable programming language, for an application may be packaged together in one or more manipulation programs where variables global to the p-segments are declared. Following execution of each p-segment, the manipulation program is generally configured to pass control to a pre-defined program referred to as FlowGenerator, which takes as input parameters the variable values read or calculated by the p-segment and returns an indicator as to which portion (p-segment) of the manipulation program should be executed next. In general, FlowGenerator will either return (i) a positive integer, indicating to the manipulation program that it must next execute the p-segment having that integer as its label, (ii) the number 0, indicating that the manipulation program should terminate normally, or (iii) a negative integer indicating that the manipulation program should terminate abnormally. For example, a manipulation program (or "m-program") containing three p-segments may be written as follows:

```
int currentSegment=1;
while (1)
{
switch (currentSegment)
{
    // successful completion of the m-program
```

```
case 0:
    printf("program was successful\n");
    return(0);
// error occurred
case -1:
    printf("program was not successful\n");
    exit(1);
case 1:
    p-segment1(var1, var2);
    currentSegment=FlowGenerator(var1, var2);
    continue;
case 2:
    p-segment2(var1, var2);
    currentSegment=FlowGenerator(var1, var2);
    continue;
case 3:
    p-segment3(var1, var2);
    currentSegment=FlowGenerator(var1, var2);
    continue;
};
};
};
```

This simple example manipulation program includes three p-segments associated with identifiers 1, 2 and 3 corresponding to programs p-segment1, p-segment2 and p-segment3 respectively. The actual code for those p-segments is not shown. Each p-segment may contain various statements such as to read values from an input source, calculate values using standard arithmetic operations, and control the flow of execution within the p-segment using conditional and loop statements. Other than through shared global variables, the p-segments are independent of each other and their sequencing is directed by the FlowGenerator program, which operates by processing an f-program that specifies the sequencing of the p-segments and also may validate the values of the parameters read or calculated by the p-segments.

More generally, there will be some number N, being a positive (non-zero) integer, of p-segments, which p-segments may typically be labelled with sequential integers 1, 2, 3, . . . , N (although any unique labelling will suffice).

The m-program is configured to designate one of the p-segments to be the first p-segment to execute. In the above example, p-segment1 is designated to execute first by setting currentSegment to 1 initially.

An f-program comprises a header followed by a number of f-segments that are labelled so that every f-segment is associated with one or more of the N unique identifiers such that each unique identifier is associated with exactly one f-segment. In a simple case, there may be N f-segments, each having the same label as one of the p-segments. The f-program generally terminates with the keyword "end" or the equivalent.

The f-program header contains information that is applicable to the entire f-program. It normally includes declarations of all the parameters of the f-program, which includes all the parameters that will be received from p-segments. When the f-program is called for the first time, memory is allocated for the declared parameters.

In a basic embodiment of the language, the syntax of f-programs and f-segments can be defined by a standard EBNF (Extended Backus-Naur Form) grammar as follows.

f-program=f-program-header, f-segment, {";", f-segment}, "end", ";";
f-program-header="store", file-specification, ["protected"], "having parameters", "(", datatype, var, {";", var}, ")", "and" positive-integer, "p-segments", ";", "#", comment, "#";
f-segment=f-seg-header, "{", [acceptance-section, ";"], interaction-section, "}";
f-seg-header=label, {";", label}, [f-segment-type], ";", "(", [acc-var, {";", ace-var}], ";", [int-var, {";", int-var}], ")", "#", comment, "#";
acceptance-section=["skip the acceptance section"]|acc-f-expression, {";", acc-f-expression};
acc-f-expression="if", "(", condition, ")", acc-result|calculation;
ace-result="accept"|"accept else return", negative-integer|"reject return", negative-integer;
interaction-section=interaction-stmt, {";" interaction-stmt};
interaction-stmt=if-stmt|int-f-expression;
int-f-expression="if", "(", condition, ")", int-result|calculation;
int-result="execute", "p-segment", label;
if-stmt="if", "(", condition, ")", "do", interaction-section, ["else if", "(", condition, ")", "do", interaction-section], ["else do", interaction-section];

As usual in EBNF a comma (unquoted) indicates concatenation, a vertical bar (unquoted) indicates alternatives, a semi-colon (unquoted) represents the end of a production rule, square brackets (unquoted) enclose optional elements and curly braces (unquoted) indicate that the enclosed expression can be repeated zero or more times. Elements in double quotes (" ") are literals that appear in the program exactly as indicated between the quotes.

A file-specification is a suitable specification of the file that the f-program is stored in, such as a directory path ending in the file name. Datatype is the variable type, such as "char" for a character and "int" for a standard size integer. Var is a string representing a parameter to the f-program, which may be preceded by an asterisk to indicate a pointer or followed by a positive integer in square brackets to indicate an array. For example, a simple example of an f-program-header is "store ./main.c having parameters (char sex, int mark) and 7 p-segments; # example header #".

Label can generally be any string of characters and digits except the reserved label "0" which specifies normal termination when null p-segment 0 is executed. In some embodiments, label may be limited to positive-integers.

Acc-var is a string representing the name of a parameter to the acceptance-section and int-var is the name of a string representing a parameter to the interaction-section. Each acc-var and int-var must be declared in the f-program-header. Their appearance also in the f-seg-header facilitates checking that each of the parameters intended to be used by each section is actually used.

Negative-integer is any integer less than zero and positive-integer is any integer greater than zero.

A calculation may be a statement that calculates a value of a variable from the values of one or more variables, the syntax of which is unimportant. Such calculation statements may be used, for example, to calculate values to be used in subsequent conditions. This is not essential as such calculations can generally be done in-place as part of the condition, but their use may make the f-program more readable.

F-segment-type may optionally be used to designate special types of f-segments. The default type is also referred to as a "regular" f-segment. Another type will be discussed later. The acceptance-section is optional in the above specified grammar, but in some embodiments it may be mandatory with the option of specifying the keyword "skip" or "skip the acceptance section" (the latter being included in the above grammar) rather than specifying any of the above-specified acc-f-expressions.

The acceptance section comprises a number of acc-f-expressions each of which evaluates a condition, which is generally computed based on the values of the variables identified as acc-vars in the header; and, if the condition is true, executes either an accept statement (and so continues execution in the f-segment) or a reject statement (and terminates execution in the f-segment). For example, the f-expression "if (x!=2) accept" causes control to pass to the next acc-f-expression, if any, or otherwise to the interaction-section, if the value of x is not equal to 2. If x is equal to 2, this particular statement does nothing. One may also have an f-expression "if (x=2) reject return −1" to cause control to be passed back to the m-program, specifying a next segment value (e.g. the return value of FlowGenerator) of −1, indicating an error. Alternatively one could include an f-expression "if (x!=2) accept else return −1", which combines the effects of the previous two example f-expressions. Clearly the construct "accept else return" is not essential since the same effect can be achieved with the other ace-results (e.g. the statement "if (expression) accept else return −1" is equivalent to "if (expression) accept" followed by "if (NOT expression) reject return −1"), but its use may simplify the f-program and make it more readable.

Note that it is not essential that control return to the m-program after an error is encountered. In some embodiments, the f-program may simply generate a suitable message and terminate, however, it is generally desirable to return control to the m-program so that the necessary bookkeeping, such as closing open files, can be done by the m-program before it terminates.

The acc-f-expressions may be separated with commas, as in the above grammar, with a semi-colon delimiting the end of the acceptance section.

As used herein, as in a typical computer language, a condition is a relational expression that is either true or false and is expressed using operators such as "=", "!=", "<", "<=", ">" and ">=", Boolean operators such as "not", "and" and "or" and arithmetic operators such as "+", "−", "*", and "/", each of which has its usual meaning. Parentheses may be used to constrain the order of evaluation of the relational expression. The operands of a relational expression can be constants or accessible variables (such as acc-vars in the acceptance section). Examples of conditions employing numeric variables x, y and z are "x=2" and "(x=2 and y!=3) or (y*z<10)".

Boolean variables may also be employed. A condition may also be referred to as a mono-condition to emphasize that it has only one value, which may be referred to as an "output". Each condition can be thought of as a Boolean function, or rather a program to compute such a function, which by definition has a single output value, being the value of the corresponding condition.

Constants may be coded directly into the f-program, or they may be obtained from a file. For example, a number of values may be stored in a file identified as ".\\validValues.txt", and syntax may be provided, such as "in file '.\\validValues.txt'" to permit direct reference to the values stored in the file in a condition. For example, in this case the acc-f-expression "if (accVarname not in file '.\\validValues.txt') reject return −2" may be used in the acceptance section if the value of variable with the name accVarname is not included in the file .\\validValues.txt.

In general, if a parameter is specified in the acceptance portion of the f-seg-header, it should be used in the acceptance section, and if it is not used, then an error may be automatically generated. Similarly, if a parameter is specified in the interaction portion of the f-seg-header, it should be used in the interaction section, and if it is not used, then an error may be automatically generated.

The interaction section comprises a number of interaction-stmts. In this basic embodiment, each interaction-stmt is either an if-stmt or an int-f-expression. In more complex embodiments, other constructs, such as looping, may be provided in a way comparable to the if-stmt. The if-stmt is essentially a standard if-then-else statement that can conditionally execute other interaction-sections, which may be referred to as "sub interaction-sections" (which in this embodiment have the same syntax as the top-level interaction-section). The int-f-expressions may either be a calculation (which may be used to calculate variables used in a condition) or of the form "if (condition) execute p-segment label". When such an int-f-expression is executed, the condition is first evaluated. If it is false, control goes to the next interaction-stmt, if any, or otherwise the f-segment ends. If it is true, then control is returned to the p-segment associated with the specified label.

In some advanced embodiments, other types of f-segments may be permitted. For example, a "producer" f-segment may be indicated by the f-segment-type "producer". In general, the statements of an m-program are used to manipulate data. At the same time there are statements that generate data known as read statements used by a number of other p-segments of the same m-program. Thus, FlowGenerator may not only identify corresponding p-segments but at the same time their purpose, which may be defined by the f-segment-type. For example, the syntax "currentSegment=FlowGenerator (&nextSegment, argument)" may be used to specify, in the case of a producer, that the next p-segment to execute is currentSegment, and after that is done, then nextSegment is to be executed. To facilitate such embodiments, the following additional int-result may be defined.

int-result="combine", "p-segment", positive-integer, "|", "next p-segment", positive-integer;

Note that the vertical bar in the above is part of the int-result (rather than part of the EBNF production rule). The above int-result statement indicates that FlowGenerator is to return with currentSegment set to the first positive-integer (before the vertical bar), and nextSegment set to the second positive-integer (after the vertical bar). The m-program must also be configured to use the returned values to sequence the p-segments accordingly. The above "combine" form of int-result may be used in addition to the "execute" form (so that the "combine" form is only used by producer f-segments) or may be used alternatively so that, when the f-segment is not a producer, the first positive-integer (before the vertical bar) is ignored and the next p-segment to be executed is indicated by the second positive-integer (after the vertical bar).

In this embodiment, when FlowGenerator returns control to a p-segment, regardless of the type of p-segment it is, it returns the values of two pointers, the first being currentSegment and second being nextSegment. The value of currentSegment is used for producers' p-segments, whose exclusive purpose is to read data values that are used by a number of regular p-segments. In this case, currentSegment determines which regular p-segment is to be processed. The p-segment to give control to after currentSegment completes is specified by the pointer nextSegment. Hence, before control goes to the loop statement, a program has to execute the assignment statement "currentSegment=nextSegment;". This works even if an m-program has a number of producer p-segments.

If an f-segment reaches the end (i.e. the end of the interaction section), an implied statement "reject return −1" causing the error code −1 to return to the m-program may be executed.

When an m-program is executed, it processes the first designated p-segment, and then calls the pre-defined program FlowGenerator, which sends control to the f-segment associated with the unique identifier of the completed p-segment. So if p-segment 1 is executed first, as in the above example m-program when it is run, then after it completes control is passed to the f-segment with label 1 (of which there is exactly one). If there is an acceptance section in f-segment 1, it executes first, and will either allow control to pass to the interaction section of f-segment 1, if no "return" is hit, or will return control back to the m-program to indicate that an error has occurred and terminate. In the former case, the interaction section executes until a condition in an int-f-expression is evaluated as true, so that control is then returned to the p-segment corresponding to the label specified after the "execute" keyword. For example, if the int-f-expression "if (x=2) execute p-segment 3", then FlowGenerator would return the value 3 to the m-program to cause the m-program to next execute p-segment 3. This continues, with control passing back and forth between the f-program and m-program, until a termination value (0 or a negative integer) is returned by FlowGenerator. As such, the f-program and m-program operate as programmable co-routines and not as default ones that have a fixed flow.

The basic language described above may be further augmented to provide more complex flow control. For example, the following additional int-result may be defined.

int-result="combine", "p-segment", positive-integer, ["to call program", program-identifier, {",", program-identifier}], "|", "next p-segment", positive-integer;

Program-identifier may be the name of an m-program, so that a sequence of m-programs may thereby be called. Each such m-program would have a corresponding f-program to control the sequencing of its p-segments in the manner previously described.

A key value of the invention can be seen to be the separation of the specification of the flow of the p-segments from the m-program. The f-program can be specified by a program architect, who can then instruct programmers to separately design and implement each p-segment, specifying to each programmer, for each p-segment, the input, output and processing required. This could be done in words, or by a flow chart, data-flow diagrams, or a suitable combination of such mechanisms. The granularity of the breakdown of the system design into p-segments is a design choice of the architect. Depending on the complexity, an individual p-segment could also be specified by specifying an f-program for the required processing with suitable specifications for the "sub p-segments" that are used to implement the p-segment.

The use of an f-program to specify the top-level control flow has multiple advantages. The first is that the use of a well-designed acceptance section for each p-segment can help ensure correctness of the separately implemented p-segments. Equally importantly, an f-segment can be specified in a readily understandable and machine-translatable form, which we refer to as a semantic-diagram or ""s-diagram".

A basic unit of an s-diagram is a triadic, an example of which is shown in FIG. 1. A triadic is formed from two labelled rectangles, each representing a p-segment, an oval representing a condition, and directed edges from one rectangle to the oval and from the oval to the other rectangle. The triadic of FIG. 1 indicates that when the p-segment labelled A 100 completes, control is intended to return to f-segment A, which is to execute an f-expression that causes control to be passed to p-segment B 102 if the condition 101 specified in the oval is true. The combination of the condition 101 and the rectangle 102 specifying the next p-segment can be used to directly generate an int-f-expression corresponding to "if (condition) execute p-segment B".

Figure 2:
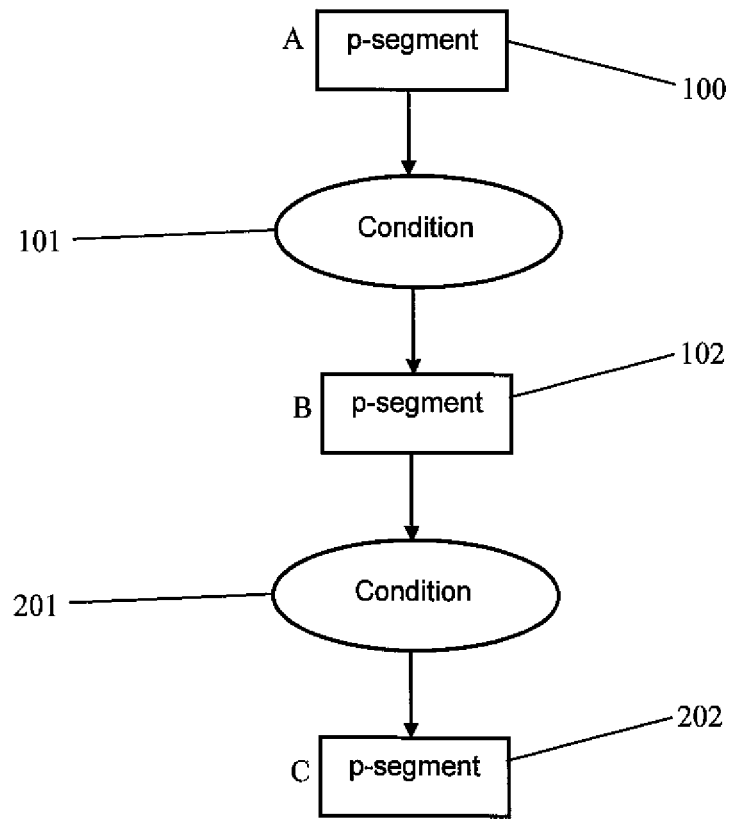
FIG. 2 is an s-diagram containing two successive triadics.

FIG. 2 shows two triadics in sequence. In addition to the elements of FIG. 1, the second triadic specifies that if the condition 201 is true, then control is to be passed to p-segment C 202.

Figure 3:
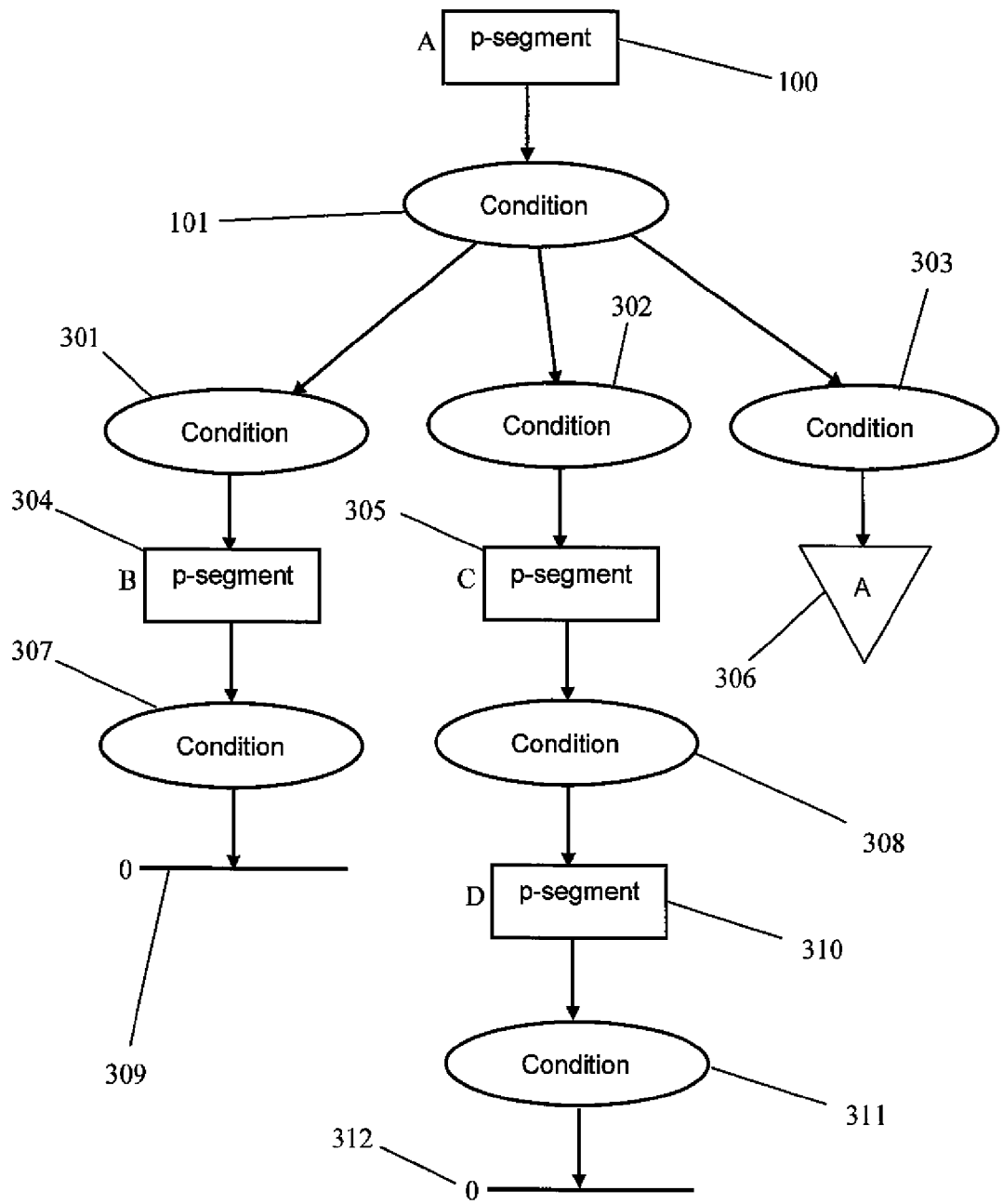
FIG. 3 is an s-diagram containing multiple p-segments and multiple conditions.

A more complete example of an s-diagram is shown in FIG. 3. This s-diagram includes cascaded condition nodes so that conditions 301, 302 and 303 are evaluated subsequent to condition 101. FIG. 3 includes three segments, the first comprising the triadic of p-segment A 100, condition 101, condition 301 and p-segment B 304, as well as the triadic of p-segment B 304, condition 307 and the null p-segment 309. The null p-segment is given a reserved label of 0 and indicates normal termination of the program. Cascaded conditions, such as condition 101 followed by condition 301 are equivalent to a single condition formed by AND'ing the cascaded conditions.

The second segment comprises (1) the triadic of p-segment A 100, condition 101, condition 302 and p-segment C 305, (2) the triadic of p-segment C 305, condition 308 and p-segment D 310, as well as (3) the triadic of p-segment D 310, condition 311 and the null p-segment 312 (which is identical to the null p-segment 309).

The third segment comprises the triadic of p-segment A 100, condition 101, condition 303 and p-segment A 100, the latter being indicated by the upside-down triangle 306 labelled "A" to indicate that control goes to p-segment A if condition 303 is true.

In this case, f-segment A would have three int-f-expressions corresponding to (1) if (condition 101 AND condition 301) execute p-segment B, (2) if (condition 101 AND condition 302) execute p-segment C and (3) if (condition 101 AND condition 303) execute p-segment A. The structure and content of the f-segment is dictated directly by the s-diagram.

Conditions in s-diagrams may also be labelled. For example, any condition that directly follows a rectangle may be assigned a label being the same number as the ancestor rectangle. Then any condition that directly follows another condition may be assigned a label being the same number as the ancestor condition.

Note that when it is stated that a first node is connected to a second node, this is intended to mean that the directed edge points from the first node to the second node.

Based on the fact that cascaded conditions in an s-diagram are equivalent to a single condition formed by AND'ing the cascaded conditions, every s-diagram is equivalent to an s-diagram in which every edge either (1) connects a p-segment to a condition or (2) connects a condition to a p-segment. Cases (1) and (2) differ in the direction of the edge. A special case of (2) occurs when an edge connects a condition to a triangle that represents a p-segment that is depicted elsewhere in the s-diagram as a rectangle. Such s-diagrams may be referred to as canonical s-diagrams.

An f-program can be generated from an s-diagram by a computer program running on a computer processor. Each occurrence of a condition node connected by an edge to a p-segment node corresponds to a specific f-expression that can be generated and incorporated into the interaction section of the f-segment corresponding to the p-segment preceding the condition. In this way, each triadic in the s-diagram uniquely specifies one f-expression of a specified f-segment. Such a triadic is uniquely defined by the presence of each f-expression in an f-segment, so that a unique (to within an isomorphism) s-diagram can be generated from any f-program. All s-diagrams corresponding to one f-program are isomorphic (where cascaded conditions are isomorphic to a single conjunctive combination condition formed from the individual conditions). Of course, the input to the computer program may not be a graphic representation of an s-diagram as shown in the figures; rather it is generally a data structure specifying the s-diagram (i.e. specifying each node and how they are connected by directed edges). The specification of a condition node is generally a relational expression defining the condition. The specification of a p-segment node is generally the unique identifier of the p-segment. The specification of the p-segment's functionality is done separately, but such specifications will be indexed by the associated unique identifier. A suitable name for the p-segment may summarize the required functionality of the p-segment.

The manipulation program may be automatically generated by a program generator based on a specification of N programs representing the p-segments. The specification includes information on how to call each program or the actual code statements making up the program. The manipulation program, upon execution, first passes control to a designated first p-segment. After the completion of each p-segment, control is passed to the f-segment associated with the unique identifier associated with the completed p-segment.

An f-segment may correspond to multiple p-segments, as indicted by having multiple labels in the f-seg-header. For example, the f-segment header "4,2,3,1,6,7 regular: (mark, sex; sex, mark); # an example f-segment #" indicates that the following f-segment is associated with p-segments 1, 2, 3, 4, 6 and 7, so that FlowGenerator will send control to this f-segment after the completion of any one of p-segments 1, 2, 3, 4, 6 or 7.

The acceptance section variables (acc-vars) in the f-seg-header form an unordered subset of the f-program parameter list (without data types), as do the interaction section variables (int-vars). A comment, consisting of a string of characters, symbols other than "#" and digits, may be required at the end of the f-seg-header. This may be stored in a text file "mandatoryComment.txt", for example.

Any variable used in the acceptance section must be declared as an acc-var in the first (acceptance) portion of the parameter list in the f-seg-header between the left parenthesis and the semi-colon. Similarly, any variable used in the interaction section must be declared as an int-var in the second (interaction) portion of the parameter list in the f-seg-header between the semi-colon and the right parenthesis. The ordering of the acc-var and int-var declarations is irrelevant, but each must correspond to a var declared in the parent f-program-header.

The acceptance section is used to verify the correctness of the used and generated data values of the corresponding p-segment. In case of an error the f-expression causes control to be passed to the p-segment −1 (or another negative integer). In other words the acceptance section may verify the operational correctness of the corresponding p-segment. There are cases that the acceptance section may be unnecessary and so skipped, such as when the values of the parameters are known to have been provided by a reliable source.

Comments, which are not shown in the above grammar, other than as part of the f-seg-header and f-program-header, may be supported in any suitable manner, such as by being preceded by two forward slashes (//) as shown in the example manipulation program above, specifying that everything up to the following newline character is to be ignored by the language processor.

When an f-segment transfers control, it may automatically put the identifier of the p-segment that it is transferring control to on a stack. Then, when an f-segment is first called, it can pop the value off the stack and check that control was received back from the same p-segment and, if not, generate and error and terminate.

In some embodiments, an f-program may be optionally protected so that when control arrives at the protected f-program and before its process begins a user must supply the required password. This may be facilitated by a keyword such as "protected" as in the example f-program-header "store".\\colours.c" protected having parameters (char colour [7], float value) and 6 p-segments;". If the user inserts the correct password the process begins, otherwise an error is generated and the program is enforced to exit with an error.

The f-programs may be stored in a single link list structure whereas a record has a name to uniquely identify an f-program within an f-base. The translation of an f-program generates many independent lists of data structures that their heads are stored in the translated data structure of the f-program. The translation of an f-program may be stored in a record that contains:

1. the head-pointer to parameters,
2. the head-pointer to f-segments,
3. the number of f-segments in the f-program,
4. the head-pointer to f-segment list,
5. the head-pointer to mandatory comments,
6. a flag to determine whether or not the f-program is protected, and
7. a flag to determine whether or not the f-program is disabled.

During interpretation time the f-program's single list structure is processed to find and read the record's f-program name that matches the current's f-program name. Then the attribute (7) is checked and if it is set (it has the value 1) it means the f-program is disabled and the corresponding m-program is enforced to exit the system. Then the attribute (6) is examined and if it is set it requires the user to insert the required password. If the password is correct, processing of the f-program's parameter structure takes place; otherwise we have an error and as before and the m-program is forced to exit.

There are structures equivalent to an s-diagram that can be used to represent an f-program. Two examples are (1) a Semantic Table (s-table) and (2) a Program Expansion Syntax (pes).

The s-table is a two dimensional table in which the rows represent the states of an m-program, which are the p-segments of the m-program. The columns represent the conditions of the state. During execution, a new state is defined as an element of the table when a condition of the current state is true (recursion allowed). Hence, the order of the conditions in a state is irrelevant. Multiple cascading conditions are combined into single conditions.

The program expansion syntax represents a state and all the states that can be combined with as a set of ordered pairs. An ordered pair has as first element a mono-condition and as second element a new state. The program expansion syntax is defined by the symbol →. Thus, the program expansion syntax for a particular state, which may be referred to as P, has:

P→{$(m_i, p_i)|m_i$ (i=1 to n) represents the $i^{th}$ mono-condition and $p_i$ (i=1 to n) represents the $i^{th}$ p-segment}

If there is a poly-condition (i.e. cascaded conditions), they are converted to an equivalent mono-condition, as in a canonical s-diagram. Any ordered pair $(m_i, p_i)$ represents a branch of an s-diagram.

In more detail a particular state P can be represented as:

P→{$(m_1, p_1) (m_2, p_2) (m_3, p_3) \ldots (m_n, p_n)$}

Thus, the program expansion syntax is similar to a BNF grammar that describes the syntax of the processes instead the grammatical processes.

A very simple example of an m-program and an f-program follows. Suppose a teacher asks her students to write a number of subprograms that answer various questions. Among them is the subprogram 'colours' that requires the students to determine the prime colours in the correct order (which is defined to be "red" followed by "yellow" followed by "blue").

Moreover, the teacher wishes some specific students to have access to this subprogram which must be written in single p-segments such that:
   the first colour (which is 'red') to be defined in the p-segment 1;
   the second colour (which is 'yellow') to be defined in the p-segment 2; and
   the third colour (which is 'blue') to be defined in the p-segment 3.

The students may not know that the teacher wrote an f-program that enforces the colours to be inserted in the specified order.

An f-program for this example is shown below.

```
store ".\\colours.c" protected having parameters (char colour[7]) and 3 p-segments; # determine the prime colours in a predefined order #
// the f-segments begin
   // f-segment 1
   1 regular: (colour; colour) # the colour must be 'red' #
   {
      // the 'acceptance section' begins
      if (colour="red") accept else return –2;
      // the 'interaction section' begins
      if (colour="red") execute p-segment 2;
   } // end of f-segment 1
   // f-segment 2
   2 regular: (colour; colour) # the colour must be 'yellow' #
   {
      // the acceptance section begins
      if (colour!="yellow") reject return –3;
      // the interaction section begins
      if (colour="yellow") execute p-segment 3;
   } //end of f-segment 2
   // f-segment 3
   3 regular: (colour; colour) # the colour must be 'blue' #
   {
      // the acceptance section begins
      if (colour="blue") accept;
      // the interaction section begins
      if (colour="blue") execute p-segment 0;
   } // end of f-segment 3
end; // the end of the f-program
```

Note that the use of sequential numeric labels 1, 2 and 3 is arbitrary and not required. If desired, multiple labels may be associated with any f-segment.

A corresponding m-program is shown below.

```
// declarations not shown
currentSegment=1;
while (1)
{
   switch (currentSegment)
   {
      // successful completion of the m-program
      case 0:
         printf ("m-program was successful\n");
         return(0);
      // the error states
      case –1: // this case is processed when the colour is not blue
         printf ("the colour must be 'blue'\n");
         exit(1);
      case –2: // this case is processed when the colour is not red
         printf ("the colour must be red\n");
         exit(1);
      case –3: // this case is processed when the colour is not yellow
         printf ("the colour must be yellow\n");
         exit(1);
      // the p-segments of the m-program
      case 1: // the colour 'red'
         sprint (colour, % s, "red");
         currentSegment=FlowGenerator (colour);
         continue;
      case 2: // the colour 'yellow'
         sprint (colour, % s, "yellow");
         currentSegment=FlowGenerator (colour);
         continue;
      case 3: // the colour 'blue'
         sprint (colour, % s, "blue");
         currentSegment=FlowGenerator (colour);
         continue;
   }
}
```

The invention includes a computer system having a processor on which a language processor, or interpreter, runs and is configured to interpret the f-program language. The system can then receive and execute an f-program for sequencing the execution of a number of p-segments as described above.

Note that the f-program, m-program and p-segments may execute on separate processors even though control passes between them. Alternatively, they may all execute on the same processor or group of processors. Control may be passed between programs executing on different processors by electronic messages sent via an electronic communications network, which may be a shared bus, a LAN or a wide area network, for example.

The FlowGenerator program is a core part of the invention that is generally called following execution of each p-segment. The executable FlowGenerator program generally is stored in a computer-readable memory accessible by the control processor that runs the p-segments. The FlowGenerator program can be considered to be part of a customized computer system that includes a processor, memory and the FlowGenerator program, which is based on multitasking processes.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the interne, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, EPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A method for sequencing the execution of a number of p-segments by a computer processor, the number being an integer greater that zero and referred to as N, each p-segment being a sequence of one or more statements executable by the processor, each p-segment having a unique identifier, the p-segments being stored in a memory accessible by the computer processor, the p-segments being part of a manipulation program or being called from the manipulation program, the method comprising the steps of:

(a) providing a flow sequencing program comprising a plurality of f-segments, each f-segment being associated with one or more of the N unique identifiers such that each unique identifier is associated with exactly one f-segment;

(b) configuring the manipulation program to cause control to be first passed to a designated first p-segment upon execution of the manipulation program;

(c) configuring the manipulation program so that after the completion of execution of each p-segment, control is passed to the f-segment associated with the unique identifier associated with the completed p-segment and at least one variable identifier and value of the variable computed by the completed p-segment is passed to the f-segment;

wherein each f-segment is configured either to cause execution of the manipulation program to terminate, or to cause control to be passed to one of the p-segments, and wherein a plurality of the p-segments comprise at least two statements, and wherein the flow of control between p-segments is not specified in the manipulation program, and wherein at least one of the f-segments comprises an acceptance portion and an interaction portion, the acceptance portion being executed before the interaction portion, the acceptance portion comprising at least one statement to verify that the value of the variable corresponding to the at least one variable identifier is within a particular range or is equal to a particular value, and if the value of the variable is not within the particular range or the value of the variable is not equal to the particular value, as the case may be, the f-segment causes execution of the manipulation program to be terminated.

2. The method of claim 1, further comprising the step of executing the manipulation program on the computer processor, and wherein each p-segment is configured to complete its execution within a finite time, and the flow sequencing program is configured to cause execution of the manipulation program to terminate within a finite time.

3. The method of claim 1, wherein the configuration of the manipulation program to cause control to be passed to the f-segment associated with the unique identifier associated with a completed p-segment after the p-segment has completed is done by inserting a call in the manipulation program to a pre-defined program, referred to as FlowGenerator, after each p-segment so that the FlowGenerator program causes control to be passed to the f-segment associated with the unique identifier associated with a completed p-segment after the p-segment has completed, and the FlowGenerator program returns the identifier of the next p-segment to be executed to the manipulation program, the manipulation program being configured to pass control to the p-segment identified by the returned identifier.

4. The method of claim 1, wherein at least one f-segment is configured to cause an error to be generated and execution of the manipulation program to be terminated on the occurrence of a pre-determined condition.

5. The method of claim 1, wherein the interaction portion of at least one f-segment comprises at least one f-expression, each f-expression comprising a condition and a specification of the unique identifier of a p-segment that is to be executed next if the condition is evaluated as being true.

6. The method of claim 5, further comprising an initial step of providing a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the flow sequencing program corresponds to one condition node and one p-segment node with an edge extending from the condition node to the p-segment node.

7. The method of claim 6, wherein the flow sequencing program is generated from the canonical s-diagram.

8. The method of claim 7, wherein the flow sequencing program is generated from the canonical s-diagram by a computer program running on a computer processor.

9. The method of claim 6, wherein the step of providing a flow sequencing program comprises generating the flow sequencing program from the canonical s-diagram.

10. The method of claim 1, wherein each f-segment has an interaction portion.

11. The method of claim 1, wherein a plurality of f-segments have an acceptance portion.

12. The method of claim 1, wherein the flow sequencing program executes on the same computer processor as the manipulation program and p-segments.

13. The method of claim 1, wherein the flow sequencing program and at least one of the p-segments are written in different programming languages.

14. The method of claim 1, wherein the manipulation program is automatically generated by a program generator based on a specification of N programs representing the p-segments so that the manipulation program, upon execution, first passes control to the designated first p-segment and after the completion of each p-segment, passes control to the f-segment associated with the unique identifier associated with the completed p-segment.

15. A computer system comprising
(a) a control computer processor,
(b) a computer readable memory accessible by the control computer processor, and
(c) a language processor stored in the computer readable memory and executable by the control computer processor to receive and execute on the control computer processor an f-program for sequencing the execution of a number of p-segments by a target computer processor, the number being an integer greater than 0 and referred to as N, each p-segment being a sequence of one or more statements executable by the target computer processor, each p-segment having a unique identifier, the p-segments being part of a manipulation program or being called from the manipulation program, wherein the f-program is a flow sequencing program comprising a plurality of f-segments, each f-segment being associated with one or more of the N unique identifiers such that each unique identifier is associated with exactly one f-segment, the manipulation program is configured to cause control to be first passed to a designated first p-segment upon execution of the manipulation program and the manipulation program is configured so that after the completion of execution of each p-segment, control is passed to the f-segment associated with the unique identifier associated with the completed p-segment and at least one variable identifier and value of the variable computed by the completed p-segment is passed to the f-segment, and wherein each f-segment is configured either to cause execution of the manipulation program to terminate, or to pass control to one of the p-segments, wherein the flow of control between p-segments is not specified in the manipulation program, wherein at least one of the f-segments comprises an acceptance portion and an interaction portion the acceptance portion being executed before the interaction portion the acceptance portion comprising at least one statement to verify that the value of the variable corresponding to the at least one variable identifier is within a particular range or is equal to a particular value, and if the value of the variable is not within the particular range or the value of the variable is not equal to the particular value, as the case may be, the f-segment causes execution of the manipulation program to be terminated.

16. The computer system of claim 15, wherein the target computer processor is the control computer processor and the p-segments are stored in the computer readable memory.

17. The computer system of claim 15, wherein the target computer processor and control computer processor are separate processors and control is passed between the f-program and manipulation program by electronic messages sent via an electronic communications network.

18. The computer system of claim 15, further comprising a FlowGenerator program stored in the computer readable memory and executable by the control computer processor, wherein the configuration of the manipulation program to cause control to be passed to the f-segment associated with the unique identifier associated with a completed p-segment after the p-segment has completed is done by inserting a call to the FlowGenerator program after each p-segment in the manipulation program so that the FlowGenerator program causes control to be passed to the f-segment associated with the unique identifier associated with a completed p-segment after the p-segment has completed, and the FlowGenerator program returns the identifier of the next p-segment to be executed to the manipulation program, the manipulation program being configured to pass control to the p-segment identified by the returned identifier.

19. The computer system of claim 15, wherein the interaction portion of at least one f-segment comprises at least one f-expression, and each f-expression comprises a condition and a specification of the unique identifier of a p-segment that is to be executed next if the condition is evaluated as being true.

20. The computer system of claim 19, further comprising an f-program generator configured to receive a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the f-segment corresponding to the unique identifier of a p-segment node corresponds to one condition node, where an edge connects the p-segment node to the condition node, and another p-segment node with an edge extending from the condition node to the other p-segment node, and wherein the f-program generator generates the f-program from the canonical s-diagram by translating each set of one target condition node and one target p-segment node, where an edge connects the target condition node to the target p-segment node, into an f-expression comprising a condition corresponding to the target condition node and a specification of the unique identifier of a p-segment corresponding to the target p-segment node that is to be executed next if the condition is evaluated as being true.

21. A computer system comprising
(a) a computer processor,
(b) a computer readable memory accessible by the computer processor,
(c) an f-program stored in the computer readable memory, which f-program is executable by the computer processor, and
(d) a manipulation program comprising a number of p-segments stored in the computer readable memory, the manipulation program and p-segments being executable by the processor, the number being an integer greater than 0 and referred to as N, wherein each p-segment is a sequence of one or more executable statements and each p-segment has a unique identifier,
wherein the f-program is a flow sequencing program comprising a plurality of f-segments, each f-segment being associated with one or more of the N unique identifiers such that each unique identifier is associated with exactly one f-segment, the manipulation program is configured so that when it is executed on the computer processor, control is passed to a designated first p-segment and the manipulation program is configured so that after the completion of execution of each p-segment, control is passed to the f-segment associated with the unique identifier associated with the completed p-segment, and at least one variable identifier and value of the variable computed by the completed p-segment is passed to the f-segment, and wherein each f-segment is configured either to cause execution of the manipulation program to terminate, or to pass control to one of the p-segments, wherein the flow of control between p-segments is not specified in the manipulation program,
and wherein at least one of the f-segments comprises an acceptance portion and an interaction portion, the acceptance portion being executed before the interaction portion, the acceptance portion comprising at least one statement to verify that the value of the variable corresponding to the at least one variable identifier is within a particular range or is equal to a particular value, and if the value of the variable is not within the particular range or the value of the variable is not equal to the particular value, as the case may be, the f-segment causes execution of the manipulation program to be terminated.

22. The computer system of claim 21, wherein the interaction portion of at least one f-segment comprises at least one f-expression, and each f-expression comprises a condition and specifying the unique identifier of a p-segment that is to be executed next if the condition is evaluated as being true.

23. The computer system of claim 22, further comprising an f-program generator configured to receive a canonical s-diagram, the canonical s-diagram comprising a directed graph having a plurality of nodes and a plurality of directed edges, each node specifying the unique identifier of a p-segment or a condition that is part of one of the f-expressions, each edge connecting one p-segment node to one condition node or one condition node to one p-segment node, wherein each f-expression in the flow sequencing program corresponds to one condition node and one p-segment node with an edge extending from the condition node to the p-segment node, and wherein the f-program generator generates the f-program from the canonical s-diagram by translating each set of one target condition node and one target p-segment node, where an edge connects the target condition node to the target p-segment node, into an f-expression comprising a condition corresponding to the target condition node and a specification of the unique identifier of a p-segment corresponding to the target p-segment node that is to be executed next if the condition is evaluated as being true.

\* \* \* \* \*

UNITED STATES PATENT AND TRADEMARK OFFICE
CERTIFICATE OF CORRECTION

| | | |
|---|---|---|
| PATENT NO. | : 8,745,594 B1 | Page 1 of 1 |
| APPLICATION NO. | : 13/891532 | |
| DATED | : June 3, 2014 | |
| INVENTOR(S) | : Iossiphidis | |

It is certified that error appears in the above-identified patent and that said Letters Patent is hereby corrected as shown below:

In the Claims

Claim 1, Column 18, line 33:

Delete "that" and insert --than--

Signed and Sealed this
Twenty-sixth Day of August, 2014

Michelle K. Lee
*Deputy Director of the United States Patent and Trademark Office*